(12) United States Patent
Sakata

(10) Patent No.: US 8,308,309 B2
(45) Date of Patent: Nov. 13, 2012

(54) LIGHTING DEVICE AND PROJECTOR

(75) Inventor: Hidefumi Sakata, Tatsuno-cho (JP)

(73) Assignee: Seiko Epson Corporation, Tokyo (JP)

( * ) Notice: Subject to any disclaimer, the term of this patent is extended or adjusted under 35 U.S.C. 154(b) by 486 days.

(21) Appl. No.: 12/603,284

(22) Filed: Oct. 21, 2009

(65) Prior Publication Data

US 2010/0123881 A1    May 20, 2010

(30) Foreign Application Priority Data

Nov. 14, 2008   (JP) ................................. 2008-292420
Aug. 6, 2009    (JP) ................................. 2009-183282

(51) Int. Cl.
*G02F 1/13*     (2006.01)
*G03B 21/28*    (2006.01)
*F21V 13/04*    (2006.01)
*F21V 13/14*    (2006.01)

(52) U.S. Cl. ............. 353/99; 362/297; 359/850; 353/37

(58) Field of Classification Search .................... 353/20, 353/30, 31, 37, 38, 81, 98, 99; 359/721, 359/850, 864; 362/296.06, 297, 301
See application file for complete search history.

(56) References Cited

U.S. PATENT DOCUMENTS

| | | | | |
|---|---|---|---|---|
| 5,418,583 A * | 5/1995 | Masumoto | ....................... | 353/38 |
| 5,662,401 A * | 9/1997 | Shimizu et al. | .................. | 353/38 |
| 5,755,503 A * | 5/1998 | Chen et al. | ....................... | 353/38 |
| 6,024,451 A * | 2/2000 | De Vaan et al. | .................. | 353/20 |
| 6,089,720 A * | 7/2000 | Sawai | .............................. | 353/98 |
| 6,224,217 B1 * | 5/2001 | Tanaka | ............................. | 353/94 |
| 6,522,807 B2 * | 2/2003 | Whitehead | ....................... | 385/31 |
| 6,592,224 B2 * | 7/2003 | Ito et al. | ........................... | 353/20 |
| 6,607,276 B1 * | 8/2003 | Akiyama | ......................... | 353/38 |
| 6,637,892 B1 * | 10/2003 | Okuyama et al. | ............... | 353/38 |
| 7,614,751 B2 * | 11/2009 | Inoko | .............................. | 353/38 |
| 7,736,028 B2 * | 6/2010 | Shimaoka | ..................... | 362/304 |
| 7,901,082 B2 * | 3/2011 | Sannohe et al. | ................. | 353/30 |
| 7,901,097 B2 * | 3/2011 | Hirata et al. | .................... | 353/122 |
| 8,132,918 B2 * | 3/2012 | Sakata | ............................. | 353/20 |
| 2002/0080487 A1 * | 6/2002 | Yajima | .......................... | 359/487 |
| 2006/0146290 A1 * | 7/2006 | Yatsu | ............................. | 353/20 |
| 2007/0182931 A1 * | 8/2007 | Ushiro et al. | .................... | 353/20 |
| 2009/0196036 A1 * | 8/2009 | Sannohe et al. | ............... | 362/247 |
| 2010/0123881 A1 * | 5/2010 | Sakata | ............................ | 353/99 |
| 2010/0157251 A1 * | 6/2010 | Sakata | ............................ | 353/20 |
| 2010/0302510 A1 * | 12/2010 | Sakata et al. | .................... | 353/20 |

FOREIGN PATENT DOCUMENTS

JP    A-2001-242545    9/2001

* cited by examiner

*Primary Examiner* — John Lee
(74) *Attorney, Agent, or Firm* — Oliff & Berridge, PLC

(57) ABSTRACT

A lighting device includes: a light source which emits light around a light source axis; a reflector which has a plurality of reflection surfaces for reflecting light emitted from the light source; a plurality of converging units each of which is provided for the corresponding reflection surface of the plural reflection surfaces to receive light released from the corresponding reflection surface; and a stacking system which stacks light having passed the plural converging units on a light receiving area wherein each of the plural reflection surfaces is formed by a part of a spheroid having focuses at the position of the corresponding converging unit and the position of the light source, and each focal distance of the plural converging units becomes longer as the distance between the position of the converging unit and the light source axis increases.

8 Claims, 12 Drawing Sheets

LIGHTING DEVICE AND PROJECTOR

BACKGROUND

1. Technical Field

The present invention relates to a lighting device and a projector.

2. Related Art

A projector is known as an apparatus displaying large-screen images. This projector includes a lighting device, an image forming device, a projection lens, and other units. Illumination light emitted from the lighting device is converted into image light representing images by the image forming device. This image light is expanded and projected by the projection lens such that large-screen images can be obtained more easily than a direct-viewing type image display apparatus.

For improving image quality of the projector, it is extremely important to equalize illuminance throughout a light receiving area of the image forming device illuminated by the lighting device. A fly-eye lens array is known as an illuminance equalizing element for equalizing illuminance of a lighting device including a lamp light source. A typical fly-eye lens array has a plurality of lenses, and two fly-eye lens arrays are used as pair units.

More specifically, light emitted from an arc tube included in the lighting device having the lamp light source is reflected by a reflector toward the axis of the arc tube (light source axis). The light released from the reflector is spatially divided into partial lights each of which enters the corresponding one of the plural lenses of a first fly-eye lens array. The plural lenses of the first fly-eye lens array converge the entering lights to the corresponding lenses of a second fly-eye lens array. The light converged by one lens of the first fly-eye lens array passes through one lens of the second fly-eye lens array, and illuminates the entire region of the light receiving area. The lights emitted from the respective lenses of the second fly-eye lens array are stacked (integrated) on the light receiving area to equalize the illuminance on the light receiving area.

With recent demand for a compact projector or for other reason, miniaturization of the lighting device has been expected. For example, a technology disclosed in JP-A-2001-242545 is an effective method for miniaturizing the lighting device. According to a light source provided with a reflector disclosed in JP-A-2001-242545, the reflector has plural divisional areas each of which is constituted by a part of a spheroid produced by rotating an ellipse around its axis.

The light source is disposed at first focus of the ellipse, and one lens constituting the fly-eye lens array is disposed at second focus of the ellipse. Light emitted from the light source is converged to one lens of the fly-eye lens array for each area of the reflector. Since the reflector also functions as one of the two fly-eye lens arrays, the corresponding fly-eye lens array can be eliminated.

According to the technology shown in JP-A-2001-242545, the size of the lighting device can be reduced. However, several points need to be improved to increase light utilization efficiency and equalize illuminance on the light receiving area.

According to the light source provided with the reflector shown in JP-A-2001-242545, the distances between the light source and the respective lenses of the fly-eye lens array differ according to the plural lenses. In this case, the focuses of the lights having passed the lenses differ according to the plural lenses, and thus the widths of the illumination ranges on the light receiving area differ according to the lenses.

In this case, illuminance on the peripheral portion of the light receiving area decreases for the entire stacked lights. When the peripheral area having lowered illuminance is used for illumination, the overall illuminance does not become uniform. When the peripheral area is not used for illumination, light utilization efficiency lowers.

SUMMARY

It is an advantage of some aspects of the invention to provide a lighting device which is compact and capable of achieving preferable light utilization efficiency and providing uniform illuminance on a light receiving area. It is another advantage of some aspects of the invention to provide a projector which is compact and capable of producing high-quality images.

A lighting device according to an aspect of the invention includes: a light source which emits light; a reflector which has a plurality of reflection surfaces for reflecting light emitted from the light source; a plurality of converging units each of which is provided for the corresponding reflection surface of the plural reflection surfaces to receive light released from the corresponding reflection surface; and a stacking system which stacks light having passed the plural converging units on a light receiving area. Each of the plural reflection surfaces is formed by a part of a spheroid having focuses at the position of the corresponding converging unit and the position of the light source. Each focal distance of the plural converging units becomes longer as the distance between the position of the converging unit and the light source axis increases.

According to this structure, light emitted from the light source is spatially divided into partial lights to reach the plural reflection surfaces of the reflector and the partial lights reflect on the reflection surfaces. Each of the reflection surfaces is constituted by a part of a spheroid having focuses at the position of the converging unit corresponding to the reflection surface and the position of the light source. Thus, the partial lights reflected by the reflection surfaces are converged to the converging units. The lights having passed the plural converging units are stacked on the light receiving area by the stacking system.

Since the partial lights spatially divided from the light emitted from the light source are stacked on the light receiving area, spatial variances of illuminance of the light from the light source is reduced. As a result, the light receiving area is illuminated with uniform illuminance. The lighting device having this structure includes the reflector having function of dividing light from the light source, and thus the lighting device can be made more compact than a structure which includes an additional optical component having this function separately from the reflector.

Moreover, the focal distance becomes longer as the distance between the light source axis and the converging unit increases. In this case, deviations of the image forming positions of the partial lights produced by different distances between the plural converging units and the light source axis are decreased. Thus, the widths of the illumination ranges of the plural partial lights on the light receiving area are equalized, and the illumination ranges of the plural partial lights can be stacked without excess and shortage. By this method, illuminance on the light receiving area becomes uniform, and loss of light caused by removing the non-uniform illuminance range from illumination can be considerably reduced. Accordingly, size reduction of the device, preferable light utilization efficiency, and uniform illuminance on the light receiving area can be achieved by the lighting device of this aspect of the invention.

It is preferable that the lighting device further includes: a lens array having the plural converging units as one piece unit. In this case, the length of each elliptic major axis of the spheroids corresponding to the plural reflection surfaces differs according to the plural reflection surfaces.

By including the lens array having the plural converging units as one unit, the positional accuracy of the plural converging units becomes higher than that of a structure separately containing plural converging units. For example, for aligning an elliptic major axis of a spheroid with plural reflection surfaces, the peripheral portion of the main surface of the lens array is curved toward the light source since the positions of the plural converging units are different in the direction along the light source axis. When each elliptic major axis of the spheroids corresponding to the plural reflection surfaces differs according to the plural reflection surfaces as in this structure, the lens array can be more easily formed than the lens array having the curved peripheral portion. As in the above aspect of the invention, the effect produced by the different distances between the plural converging units and the light source axis can be reduced by controlling the focal distances of the plural converging units. Thus, uniform illuminance distribution on the light receiving area can be obtained with varied elliptic major axes for the plural reflection surfaces.

It is preferable that each exit pupil of the plural reflection surfaces is conjugate with the light receiving area.

Generally, a light source image is not formed on the light receiving area when the light receiving area is conjugate with the exit pupil in the illumination system. In this case, illuminance of the light receiving area becomes uniform. Image-forming positions of plural partial lights agree with one another with high accuracy when the focal distances of the converging units corresponding to the reflection surfaces are controlled such that the respective exit pupils of the plural reflection surfaces become conjugate with the light receiving area. Thus, light utilization efficiency considerably improves, and illuminance on the light receiving area becomes highly uniform.

It is preferable that each area of the plural reflection surfaces becomes larger as the distance between the position of the converging unit for the corresponding reflection surface and the light source axis increases.

Each of the plural reflection surfaces functions as stop for the corresponding converging unit, and the stop radius becomes larger as the area of the reflection surface increases. In this structure, each area of the reflection surfaces becomes larger as the distance between the position of the converging unit for the corresponding reflection surface and the light source axis increases. Thus, the stop radius becomes larger as the distance between the position of the converging unit and the light source axis increases, and the areas of the illumination ranges of the plural partial lights are equalized with high accuracy.

It is preferable that the shapes of the plural reflection surfaces projected on a plane orthogonal to the light source axis are substantially similar to the shape of the light receiving area.

According to this structure, the shapes of the illumination ranges of the plural partial lights can be equalized with the shape of the light receiving area, and thus the illumination ranges of the plural partial lights can be stacked without excess and shortage.

It is preferable that a polarization conversion element which equalizes polarization condition of entering light is disposed on the optical path between the reflector and the light receiving area. The polarity conversion element has separation portions for separating entering light into first polarized light and second polarized light oscillating in directions orthogonal to each other, and conversion portions for converting the second polarized light separated by the separation portions into the first polarized light. The separation portions and the conversion portions are alternately and cyclically disposed. The disposition direction of the plural reflection surfaces almost coincides with the cyclic direction in which the separation portions and the conversion portions are disposed.

The lighting device including the polarization conversion element for equalizing polarization condition of entering light can illuminate a liquid crystal device for forming images by polarized light with high efficiency. When the disposition direction of the plural reflection surfaces almost agrees with the cyclic direction in which the separation portions and the conversion portions are disposed, lights are emitted from the plural converging units in line in the cyclic direction. Thus, lights released from the plural converging units can be supplied to the polarization conversion element with high accuracy, and the efficiency of the lighting device can be increased.

It is preferable that the plural converging units converge light passing through the converging units to the separation units of the polarization conversion element.

According to this structure, loss of light caused by entrance of light emitted from the light source into a region other than the separation units can be prevented, and light utilization efficiency can be improved.

It is preferable that the reflector is provided in such a condition as to surround a part of the light source. The lighting device further includes a second reflector provided in such a condition as to surround at least a part of the light source different from the part surrounded by the reflector to reflect light emitted from the light source toward the reflector.

According to this structure, light emitted from the light source toward the second reflector is reflected by the second reflector to reach the reflector. Then, the reflected light is extracted in the optical axis direction with light emitted from the light source toward the reflector. In this case, almost the same amount of light can be obtained even when the second reflector is made smaller than the first reflector. Thus, the size reduction of the lighting device can be easily achieved. Moreover, the spot size of light emitted from the reflector which surrounds a part of the light source becomes smaller than that of a reflector surrounding the entire circumference around the light source axis. By this method, optical components such as a lens and a mirror disposed between the reflector and the light receiving area can be small-sized.

A projector according to another aspect of the invention includes: the lighting device according to the above aspect of the invention; an image forming device which forms image light representing an image by using light emitted from the lighting device; and a projection device which projects the image light formed by the image forming device.

The lighting device according to the above aspect of the invention can achieve size reduction and illumination with high efficiency and with uniform illuminance on the light receiving area. Thus, the projector according to this aspect of the invention including this lighting device can be made compact and provide high-quality images with low power consumption.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described with reference to the drawings. The sizes and reduction scales are different from those of the actual structure for easy understanding of the characteristic parts of the structure of the invention.

First Embodiment

Figure 1:
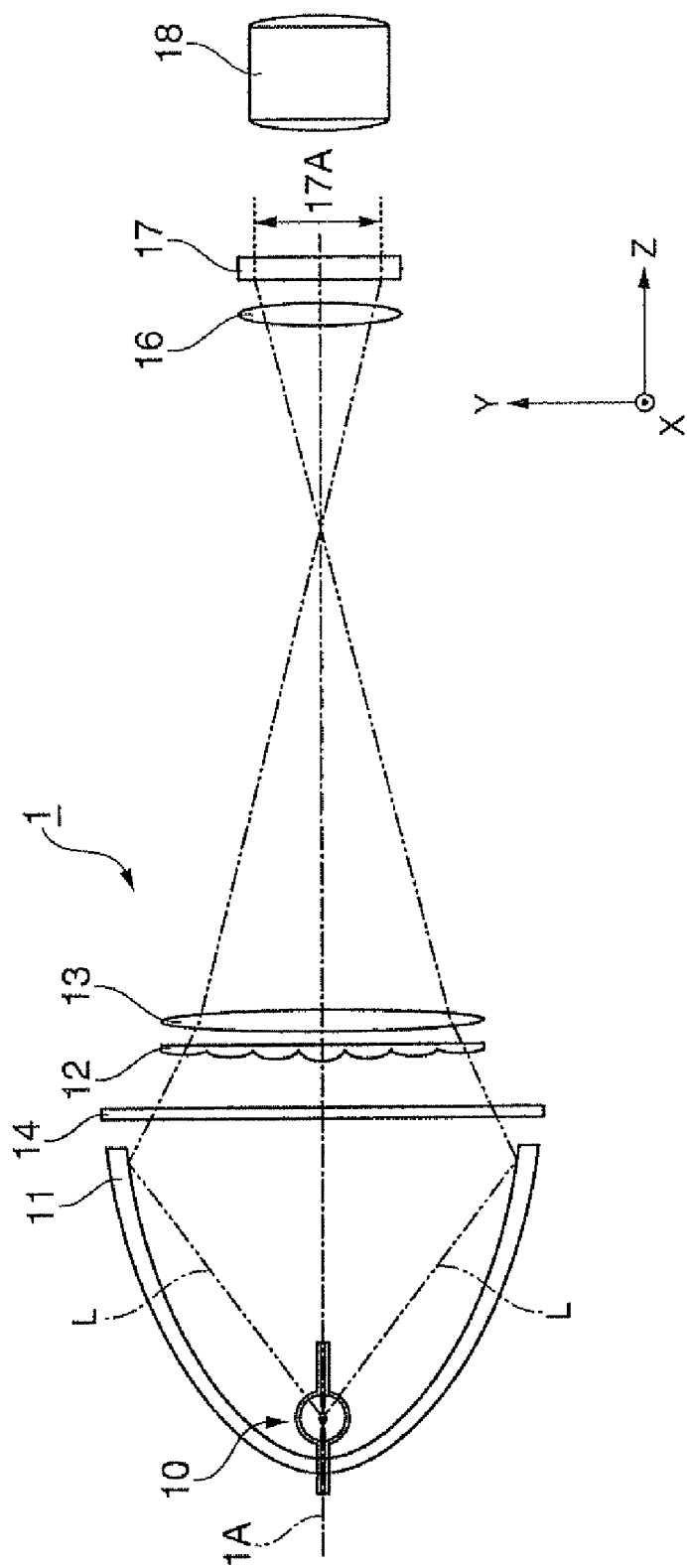
FIG. 1 illustrates a general structure of a lighting device according to a first embodiment.

FIG. 1 schematically illustrates a general structure of a lighting device 1 according to a first embodiment.

As illustrated in FIG. 1, the lighting device 1 includes a light emission lamp (light source) 10, a reflector 11, a lens array 12, and a condenser lens (stacking system) 13. Light L emitted from the light emission lamp 10 is reflected by the reflector 11, and travels substantially in the direction along a main optical axis 1A. Then, the light L passes through the lens array 12 and the condenser lens 13, and illuminates a light receiving area 17A. The main optical axis 1A is a center axis of lights emitted from the light source lamp 10 and reflected by the reflector 11. The center of gravity of the intensity distribution on the cross section orthogonal to the main optical axis 1A of the lights almost coincides with the cross point of the cross section and the main optical axis 1A. Each of the light emission lamp 10 and the reflector 11 in this embodiment has a shape symmetric with respect to the axis, and this symmetric axis (light source axis) coincides with the main optical axis 1A. This structure will be described in detail later.

The lighting device 1 according to this embodiment illuminates a liquid crystal light valve (image forming device) 17. The light L emitted from the lighting device 1 is collimated by a field lens 16 and illuminates a light receiving area 17A of the liquid crystal light valve 17. The light L having entered the light receiving area 17A is converted into image light representing an image by the liquid crystal light valve 17. The image light is expanded and projected on a not-shown screen or the like by a projection lens 18. By this method, a large-screen projection image (picture) can be produced. In this embodiment, a filter 14 is disposed between the reflector 11 and the lens array 12. The filter 14 removes components unnecessary for image such as ultraviolet light and infrared light from the light L emitted from the light emission lamp 10.

The positional relationship between the respective components is now discussed based on XYZ orthogonal coordinate system shown in FIG. 1. In the XYZ orthogonal coordinate system, the direction parallel with the main optical axis 1A corresponds to Z direction, and two directions orthogonal to the Z direction correspond to X direction and Y direction. The X direction and Y direction are orthogonal to each other, and the XY plane extending along these two directions is parallel with the light receiving area 17A. The light receiving area 17A has a substantially rectangular flat shape when projected on the XY plane. In this embodiment, the longer side direction of the substantially rectangular shape corresponds to the X direction, and the shorter side direction corresponds to the Y direction.

Figure 2A:
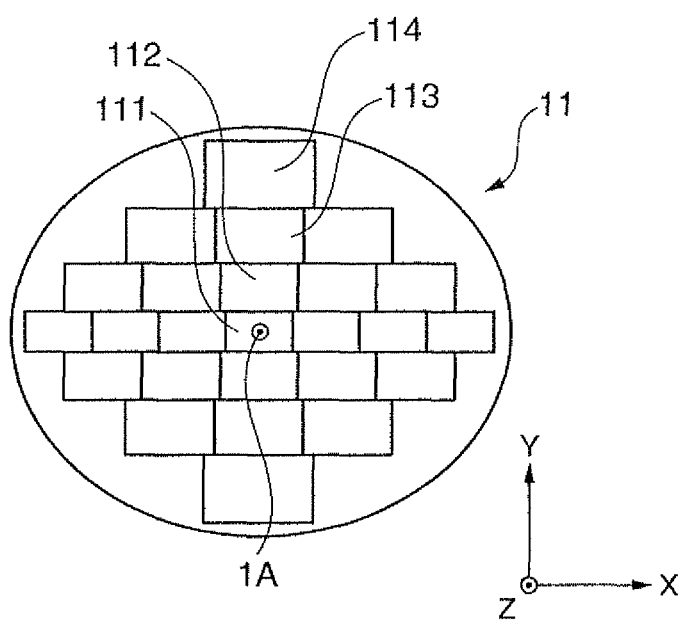
FIG. 2A is a front view of a reflector.
Figure 2B:
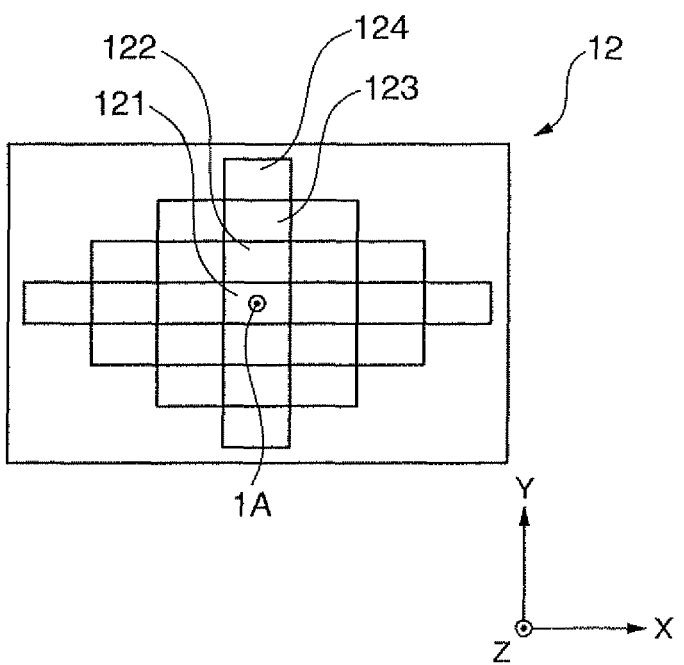
FIG. 2B is a front view of a lens array.

FIG. 2A is a front view of the reflector 11 as viewed from the opening side. FIG. 2B is a front view of the lens array 12. FIGS. 2A and 2B correspond to plan views showing the reflector 11 and the lens array 12, respectively, projected on surfaces orthogonal to the main optical axis 1A.

As illustrated in FIG. 2A, reflection surfaces 111, reflection surfaces 112, reflection surfaces 113, and a reflection surface 114 are disposed on the inner surface of the reflector in this order in the Y direction in the direction away from the main optical axis 1A. Lens portions 121 through 124 are provided as one unit in such a position that the respective center positions of the lens portions 121 through 124 are located on the same plane substantially orthogonal to the main optical axis 1A.

As illustrated in FIG. 2B, the lens portions (converging units) 121, the lens portions 122, the lens portions 123, and the lens portion 124 are disposed on the lens array 12 in this order in the Y direction in the direction away from the main optical axis 1A. The lens portions 121 correspond to the reflection surfaces 111. Similarly, the lens portions 122, the lens portions 123, and the lens portion 124 correspond to the reflection surfaces 112, the reflection surfaces 113, and the reflection surface 114, respectively.

Each of the flat shapes of the reflection surfaces 111 through 114 is similar to the flat shape of the light receiving area 17A. The reflection surfaces 111 through 114 are disposed in the shorter side direction of the rectangle (Y direction). The sizes of the reflection surfaces 111 through 114 become larger as the distances between the positions of the reflection surfaces 111 through 114 and the main optical axis 1A in the Y direction increase. In this embodiment, each number of the provided reflection surfaces 111 through 113 is plural. The plural reflection surfaces 111 are disposed such that the respective longer side directions of the reflection surfaces 111 are aligned with one another, and that the almost entire regions of the shorter sides of each adjoining pair of the reflection surfaces 111 overlap with each other. Similarly, each disposition direction (X direction) of the reflection surfaces 112 and 113 coincides with the longer side direction. The disposition direction herein refers to the direction in which the centers of the reflection surfaces having substantially equal flat shape and size are arranged when projected on a plane orthogonal to the main optical axis 1A.

As illustrated in FIG. 2B, the lens portions 121 through 124 in this embodiment have substantially equal flat shape and size. The flat shapes of the lens portions 121 through 124 are substantially rectangular and similar to the flat shape of the light receiving area 17A. The plural lens portions 121 are provided in correspondence with the plural reflection surfaces 111. Similarly, the plural lens portions 122 and 123 are provided. In this embodiment, the lens portions 121 through 124 are disposed in array with no clearance left between one another, and the almost entire shorter sides or the almost entire longer sides of each adjoining pair of the lens portions overlap with each other.

Figure 3A:
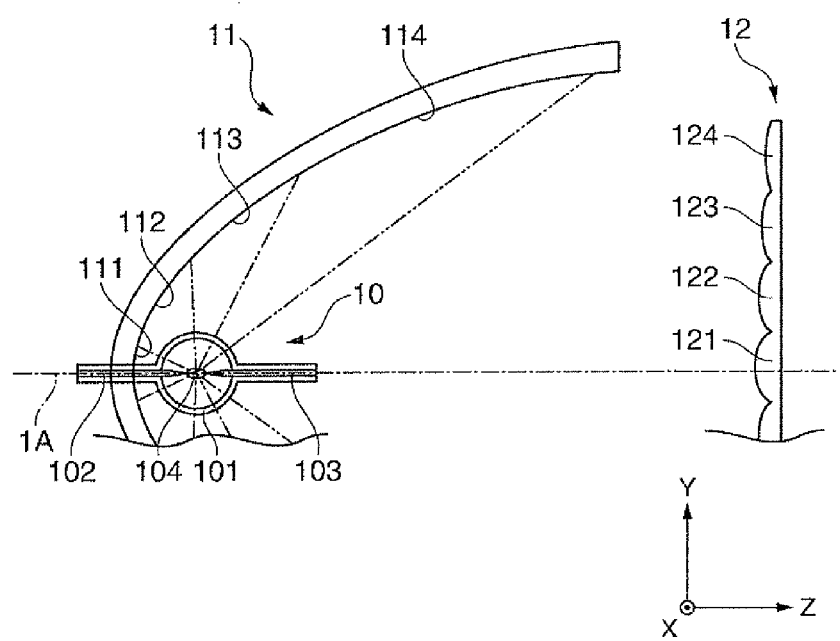
FIG. 3A illustrates an enlarged main part of the lighting device.
Figure 3B:
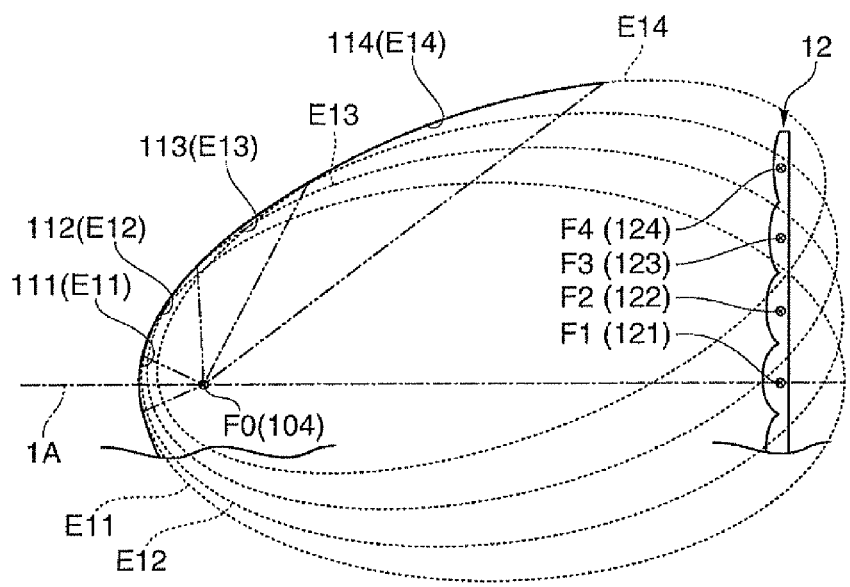
FIG. 3B illustrates positional relationship.

FIG. 3A schematically illustrates an enlarged main part of the lighting device 1, and FIG. 3B illustrates the positional relationship between the respective components shown in FIG. 3A. FIG. 3A is a cross-sectional view on the YZ plane extending along the main optical axis 1A shown in FIG. 2A. According to this embodiment, both sides of the light emission lamp 10 and both sides of the lens array 12 are symmetric with each other, respectively, with respect to the XZ plane containing the main optical axis 1A. FIGS. 3A and 38 show one of both sides (upper side in the Y direction) of these components with respect to the XZ plane as expanded views.

As illustrated in FIG. 3A, the light emission lamp 10 emits light substantially in radial directions around the light source axis. The light emission lamp 10 is constituted by a high-pressure mercury lamp, metal halide lamp, xenon lamp, light emitting diode, or the like. According to this embodiment, the light emission lamp 10 includes a pair of electrodes 102 and 103 made of tungsten or the like and sealed into an arc tube 101. When voltage is applied between the electrodes 102 and 103, light is generated between the electrodes 102 and 103. Thus, the light emission lamp 10 can be considered as a point light source having a light emission point 104 at the center of gravity position of luminance of generated light.

As illustrated in FIG. 3B, each of the reflection surfaces 111 through 114 is constituted by a part of a spheroid. More specifically, each of the reflection surfaces 111 corresponds to a part of a spheroid produced by rotating an ellipse E11 around its elliptic major axis. The ellipse E11 has first focus F0 at the light emission point 104, and second focus at a center F1 of the lens portions 121.

Each of the reflection surfaces 112 corresponds to a part of a spheroid produced by rotating an ellipse E12 having first focus F0 at the light emission point 104 and second focus at a center F2 of the lens portions 122 around its elliptic major axis.

Each of the reflection surfaces 113 corresponds to a part of a spheroid produced by rotating an ellipse E13 having first focus F0 at the light emission point 104 and second focus at a center F3 of the lens portions 123 around its elliptic major axis.

The reflection surface 114 corresponds to a part of a spheroid produced by rotating an ellipse E14 having first focus F0 at the light emission point 104 and second focus at a center F4 of the lens portion 124 around its elliptic major axis.

In this embodiment, the reflection surfaces 111 through 114 are substantially continuous surfaces constituting the inner surface of the reflector 11.

According to the embodiment of the invention, the lens portions 121 through 124 are disposed in such positions that the focal distances of the lens portions 121 through 124 become longer as the distances between the lens portions 121 through 124 and the main optical axis 1A increase. In this embodiment, the focal distances of the respective lens portions 121 through 124 are controlled such that the respective exit pupils of the reflection surfaces 111 through 114 become conjugate with the light receiving area 17A. The focal distances of the lens portions 121 through 124 are controlled by adjusting the curvatures of the lens portions 121 through 124. An example of the method for controlling the focal distances of the lens portions 121 through 124 is now discussed.

The shapes of the ellipses E11 through E14 are defined by determining the positions of the centers F1 through F4 of the lens portions 121 through 124, and the lengths of the elliptic major axes of the ellipses E11 through E14. The spheroid corresponding to the ellipse E11 is obtained by rotating the ellipse E11 around its elliptic major axis. Similarly, the spheroids corresponding to the ellipses E12 through E14 are obtained, and each line along which the outer circumferences of two spheroids cross each other is used as the contour of the corresponding reflection surface to determine the reflection surfaces 111 through 114.

The optical path length of the light emitted from the light emission point 104, passing through the reflection surfaces 111, and reaching the center F1 is determined by the length of the elliptic major axis of the ellipse E11, and thus becomes constant independently of the angle of the light emitted from the emission light point 104. In other words, the distance of the optical path extending from the light emission point 104 through the reflection surfaces 111 to the center F1 can be controlled by adjusting the length of the elliptic major axis of the ellipse E11. By this method, the optical path lengths extending from the light emission point 104 through the reflection surfaces 111 through 114 to the centers F1 through F4 can be individually controlled by adjusting the lengths of the elliptic major axes of the ellipses E11 through E14. The length of the elliptic major axis of the ellipse E11 is the sum of the distance between one end of the elliptic major axis and the first focus (first focal distance) and the distance from the one end of the elliptic major axis and the second focus (second focal distance).

The optical path lengths from the respective lens portions 121 through 124 to the light receiving area 17A can be obtained by designing the positions of the centers F1 through F4 of the lens portions 121 through 124, the position of the light receiving area 17A, and the characteristics of the optical components disposed between the lens array 12 and the light receiving area 17A. The optical path lengths from the lens portions to the light receiving area 17A become longer as the distances between the lens portions and the main optical axis 1A increase. In this embodiment, the distance between the lens portion 124 and the light receiving area 17A is the longest in the distances between the lens portions 121 through 124 and the light receiving area 17A, and the distances between the lens portions 123, 122, and 121 and the light receiving area 17A decrease in this order.

Assuming that the optical path length from the light emission point 104 to a lens portion is S1 and that the optical path length from the corresponding lens portion to the light receiving area 17A is S2, the focus distance f of the corresponding lens portion is expressed by a lens equation $(1/S1+1/S2=1/f)$. As discussed above, the optical path lengths S1 and S2 are obtained for each of the lens portions 121 through 124. Thus, the focal distance can be calculated for each of the lens portions 121 through 124. For example, each exit pupil of the reflection surfaces 111 through 114 can be made conjugate with the light receiving area 17A by adjusting the curvatures of the lens portions 121 through 124 such that the focal distances of the lens portions 121 through 124 become the calculated focal distances.

Figure 4:
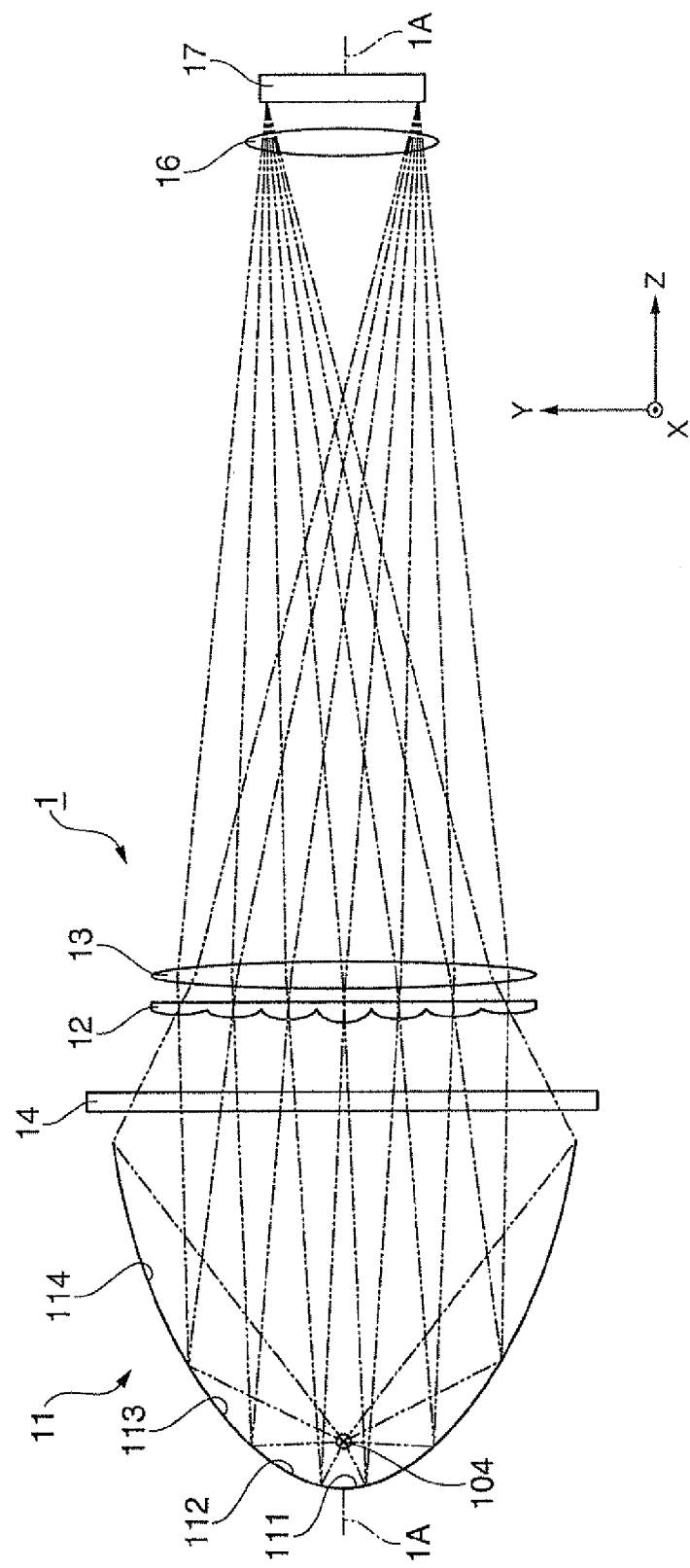
FIG. 4 illustrates a mechanism for illuminating a light receiving area by the lighting device.

FIG. 4 illustrates the mechanism for illuminating the light receiving area 17A by the lighting device 1. As illustrated in FIG. 4, lights emitted from the light emission point 104 in the radial directions are spatially divided to enter the reflection surfaces 111 through 114. That is, the reflection surfaces 111 through 114 function as field stops. Since the flat shapes of the reflection surfaces 111 through 114 are similar to the flat shape of the light receiving area 17A, the lights having passed the reflection surfaces 111 through 114 obtain cross-sectional shapes orthogonal to the main optical axis 1A as shapes similar to the flat shape of the light receiving area 17A.

The lights reflected by the reflection surfaces 111 through 114 enter the lens array 12 after unnecessary lights (such as ultraviolet light and infrared light in this embodiment) are removed by the filter 14. Since the reflection surfaces 111 are constituted by a part of the spheroid having focuses at the light emission point 104 and the center F1 of the lens portions 121, the lights having passed the reflection surfaces 111 are converged to the center F1. Similarly, the lights having passed the reflection surfaces 112 through 114 are converged to the centers F2 through F4 of the lens portions 122 through 124. By this step, a secondary light source image of the light emission point 104 is formed at each of the centers F1 through F4. Since the flat shapes of the lens portions 121 through 124 are similar to the flat shape of the light receiving area 17A, the lights having passed the lens portions 121 through 124 obtain cross-sectional shapes orthogonal to the main optical axis 1A of the lights as shapes substantially similar to the flat shape of the light receiving area 17A.

The lights from the secondary light source images arranged in array in correspondence with the lens portions 121 through 124 pass through the field lens 16, and are stacked on the light receiving area 17A by the condenser lens 13. According to this structure, the sizes of the reflection surfaces 111 through 114 become larger as the distances between the reflection surfaces 111 through 114 and the main optical axis 1A increase. Thus, the radii of the field stops become larger as the distances between the reflection surfaces 111 through 114 and the light receiving area 17A increase, and the areas of the illumination ranges of the respective lights having passed the reflection surfaces 111 through 114 become uniform. Moreover, the focal distances of the lens portions 121 through 124 are controlled such that the respective exit pupils of the reflection surfaces 111 through 114 become conjugate with the light receiving area 17A. Thus, the areas of the illumination ranges of the secondary light source images produced by the lights having passed the lens portions 121 through 124 become uniform.

As described above, the respective lights having passed the lens portions 121 through 124 have cross-sectional shapes orthogonal to the main axis 1A of the lights as shapes coinciding with the flat shape of the light receiving area 17A with high accuracy, and the areas of the illumination ranges are uniform. Thus, the lights having passed the lens portions 121 through 124 can be stacked on the light receiving area 17A without excess and shortage, providing uniform illuminance on the light receiving area 17A. Since parts having non-uniform illuminance almost disappear, the lights having passed the lens portions 121 through 124 can be used for illumination without loss. Thus, light utilization efficiency can improve. Moreover, the light emitted from the light emission lamp 10 is spatially divided into partial lights and converged to the lens portions 121 through 124 by the reflector 11. Thus, the illumination equalizing element can be provided by the single component of the lens array 12, which contributes to size reduction of the lighting device 1.

It is not intended that the technical scope of the invention is limited to the first embodiment described herein, and therefore modifications and changes may be made without departing from the scope of the invention. A modified example 1 including a modified reflector, and a modified example 2 including a modified lens array are hereinafter described.

Figure 5A:
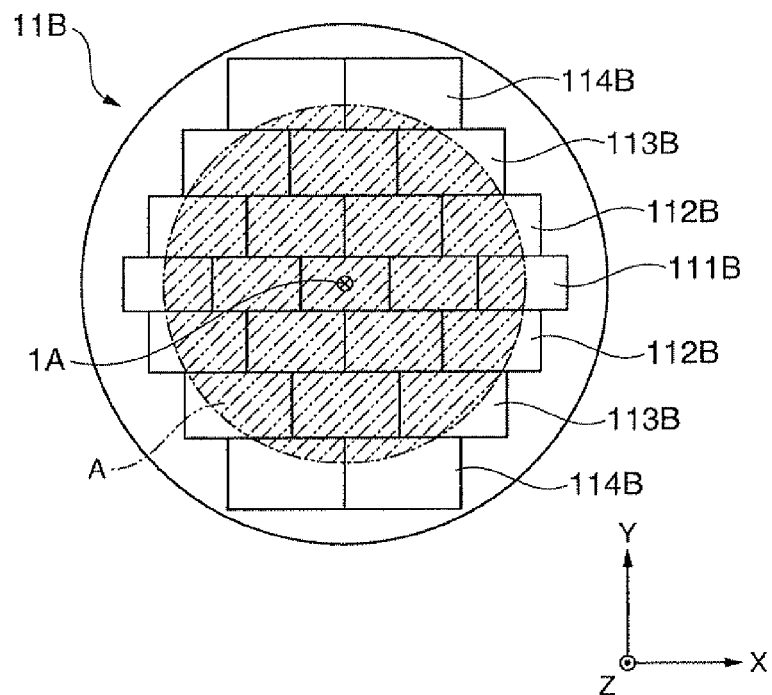
FIG. 5A is a plan view of a modified example 1.
Figure 5B:
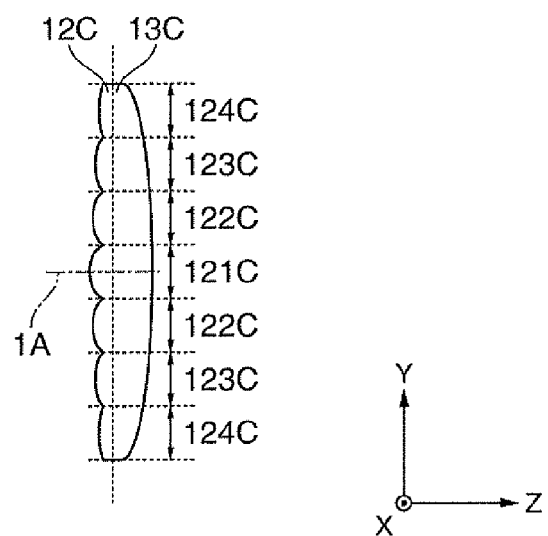
FIG. 5B is a cross-sectional view of a modified example 2.

FIG. 5A is a plan view of the modified example 1 including the modified reflector of the lighting device 1, and FIG. 5B is a cross-sectional view of the modified example 2 including the modified lens array of the lighting device 1.

As illustrated in FIG. 5A, a reflector 11B in the modified example 1 is different from the reflector 11 in the first embodiment in that the respective center positions of reflection surfaces 111B through 114E are not aligned in the Y direction.

According to the modified example 1, the numbers of the reflection surfaces 111B through 114B arranged in the longer side direction (X direction) are set at five for the reflection surfaces 111B, four for the reflection surfaces 112B, three for the reflection surfaces 113B, and two for the reflection surfaces 114. According to the arrangement of odd numbers of the reflection surfaces such as the reflection surfaces 111B and 113B, the centers of the reflection surfaces are positioned at the center of the reflector 11B in the X direction. According to the arrangement of even numbers of the reflection surfaces such as the reflection surfaces 112B and 114B, the boundaries of the reflection surfaces are positioned at the center of the reflector 11B in the X direction.

The reflection surfaces 111B through 114B are disposed such that the whole area of the reflection surfaces 111B through 114B contains an entire area A on the inner surface of the reflector 11B for receiving lights from the light emission lamp 10. In this example, the area A is an area having substantially circular shape in a plan view with the center located at the main optical axis 1A.

As apparent from above, the positions of the reflection surfaces, the number for each size of the reflection surfaces, and the total number of the reflection surfaces can be varied as necessary. For example, when the number of divisions of the light emitted from the light emission lamp 10 is increased by increasing the total number of the reflection surfaces or by other methods, the illuminance distribution on the light receiving area 17A becomes more uniform. Particularly, when the number of the reflection surfaces is 50 or larger, the illuminance distribution becomes considerably uniform. When the number of the reflection surfaces is 100 or smaller, lowering of light utilization efficiency can be prevented.

As illustrated in FIG. 5B, a lens array 12C in the modified example 2 is different from the lens array 12 in the first embodiment in that the lens array 12C is formed integrally with a condenser lens 13C to constitute an optical element. A plurality of convexes are formed on the surface of the lens array 12C on the side facing the light emission lamp 10. The plural convexes function as lens portions. One convex is provided on the opposite side of the surface on which the plural convexes are formed. This single convex functions as condenser lens.

This optical element includes a lens portion 121C, lens portions 122C, lens portions 123C, and lens portions 124C on the surface orthogonal to the main optical axis 1A in this order in the direction away from the main optical axis 1A. By using the optical element having both the functions of the lens array 12 and the condenser lens 13 as in this example, the size of the lighting device 1 can be reduced by the distance between the lens array 12 and the condenser lens 13. In this case, alignment of the lens array 12 and the condenser lens 13 is not required, and thus the cost of the lighting device 1 can be lowered. Moreover, since the relative positions of the lens array 12C and the condenser lens 13C can be controlled with high accuracy, the light utilization efficiency can be increased.

It is possible to control the focal distances of the lens portions 121C through 124O by adjusting both the shapes of the lens array 12C and the condenser lens 13C in the areas of the lens portions 1210 through 124C.

Second Embodiment

A lighting device according to a second embodiment of the invention is hereinafter described. The second embodiment is different from the first embodiment in that a plurality of reflection surfaces are not disposed adjacent to one another but are disposed with connection surfaces interposed between the respective reflection surfaces, and that lens portions are disposed such that the crossing portion of the lens array and the light source axis does not agree with the center of the lens portions.

Figure 6A:
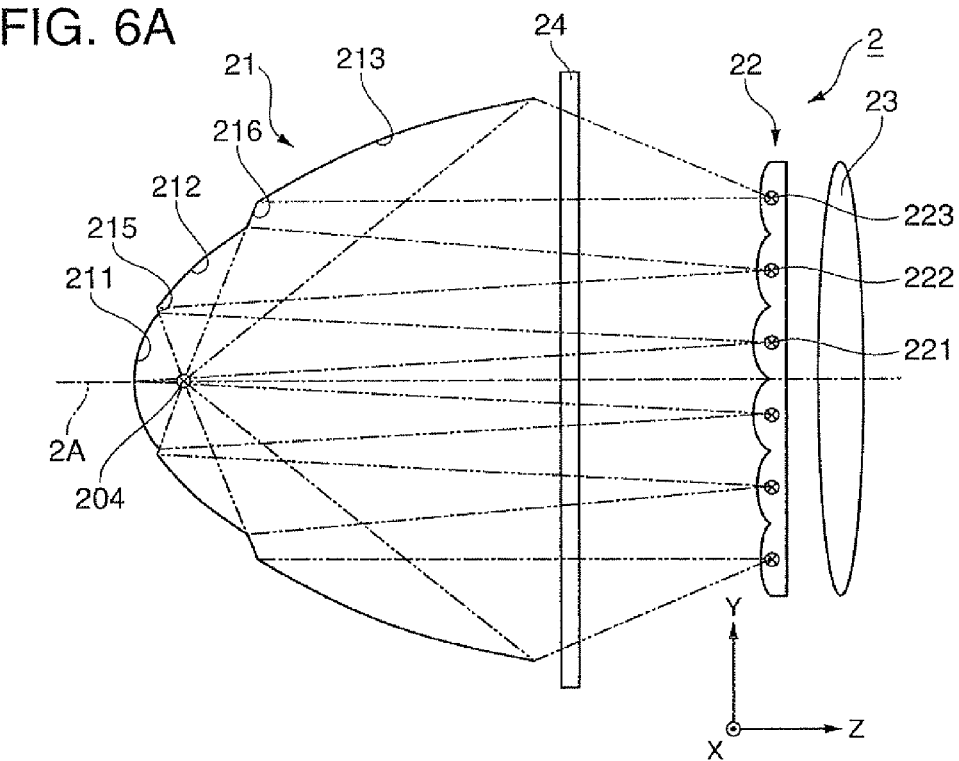
FIG. 6A illustrates a general structure of a second embodiment.
Figure 6B:
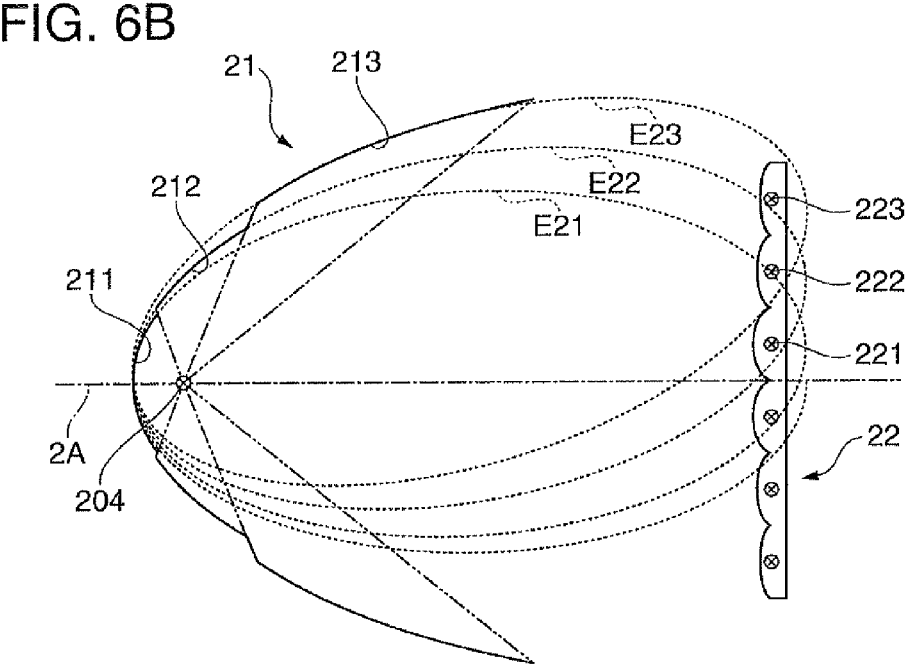
FIG. 6B illustrates positional relationship.

FIG. 6A schematically illustrates a general structure of a lighting device 2 according to the second embodiment, and FIG. 6B illustrates the positional relationship between the respective elements shown in FIG. 6A. The lighting device 2 includes a lamp light source similar to that of the first embodiment, but FIG. 6A shows only a light emission point 204 in place of the detailed structure of the lamp light source.

As illustrated in FIG. 6A, a reflection surface 211, a connection surface 215, a reflection surface 212, a connection surface 216, and a reflection surface 213 are provided on the inner surface of a reflector 21 in this order in the direction away from a light source axis 2A in the Y direction. A lens portion 221, a lens portion 222, and a lens portion 223 are provided on a lens array 22 in this order in the direction away from the light source axis 2A in the Y direction. The lens portion 221 corresponds to the reflection surface 212. Similarly, the lens portion 222 and the lens portion 223 correspond to the reflection surface 212 and the reflection surface 213, respectively.

The reflection surface 211 continues from the connection surface 215. The connection surface 215 continues from the reflection surface 212. The reflection surface 212 continues from the connection surface 216. The connection surface 216 continues from the reflection surface 213. As illustrated in FIG. 6B, each of the reflection surfaces 211 through 213 is constituted by a part of a spheroid. More specifically, the reflection surfaces 211 through 213 have the following structures.

The reflection surface 211 corresponds to a part of a spheroid produced by rotating an ellipse E21 having first focus at the light emission point 204 and second focus at the center of the lens portion 221 around its elliptic major axis. Thus, the ellipse E21 is an ellipse having focuses at the position of the light emission lamp and the position of the lens portion 211.

The reflection surface 212 corresponds to a part of a spheroid produced by rotating an ellipse E22 having first focus at the light emission point 204 and second focus at the center of the lens portion 222 around its elliptic major axis.

The reflection surface 213 corresponds to a part of a spheroid produced by rotating an ellipse E23 having first focus at the light emission point 204 and second focus at the center of the lens portion 223 around its elliptic major axis.

Thus, the ellipses E22 and E23 are ellipses having focuses at the position of the light emission lamp and the position of the corresponding lens portion.

As a different point from the first embodiment, two ellipses in the ellipses E21 through E23 cross each other in the vicinity of the end of the corresponding elliptic major axis. Thus, the lines along which the outer circumferences of the spheroids produced by rotating the ellipses E21 through E23 cross each other exist in the vicinity of the ends of the elliptic major axes. According to this structure, the reflection surfaces are formed only near the ends of the elliptic major axes of the spheroids when the boundaries of the reflection surfaces are defined by the lines along which the outer circumferences of two spheroids cross each other. In this case, substantially no light emitted from the point light source reaches the reflection surfaces, and thus the structure does not function as a reflector. For constituting the reflection surfaces by these spheroids, the reflection surfaces are connected by connection surfaces as in this embodiment.

In this embodiment, the connection surface 215 is a surface defined by a line passing the light emission point 204, the end of the reflection surface 211, and the end of the reflection surface 212. The connection surface 216 is a surface defined by a part of a line passing the light emission point 204, the end of the reflection surface 212, and the end of the reflection surface 213.

These connection surfaces are determined by the following method, for example. Initially, the contour of the reflection surface 211 is designed, and an arbitrary point is selected on the contour. Then, a straight line passing this point and the light emission point 204 is obtained, and a cross point of this straight line and a spheroid constituting the reflection surface 212 is obtained. When the selected point is shifted along the contour of the reflection surface 211 on the side away from the light source axis 2A, the cross point of the straight line and the spheroid is shifted accordingly. The track of this cross point is determined as the contour of the reflection surface 212 on the light source axis 2A side to define the connection surface 215 between the reflection surface 211 and the reflection surface 212. By designing the contour of the reflection surface 212 on the side away from the light source axis 2A, the contour of the reflection surface 213 on the light source axis 2A side is obtained by the same method. As a result, the connection surface 216 is determined.

According to the lighting device 2 having this structure, light emitted from the light emission point 204 is spatially divided to reach the reflection surfaces 211 through 213, and reflected by the reflection surfaces 211 through 213. Since the connection surfaces 215 and 216 are constituted by segments connecting the ends of the reflection surfaces, substantially no light emitted from the light emission point 204 enters the connection surfaces 215 and 216. The lights reflected by the reflection surface 211 are converged to the center of the lens portion 211 after unnecessary light is removed by the filter 24. The lights having reached the reflection surfaces 212 and 213 are similarly converged to the centers of the lens portions 222 and 223. By this step, secondary light source images are formed on the respective lens portions 221 through 223, and lights from the secondary light source images pass through the condenser lens 23 and are stacked on the light receiving area similarly to the first embodiment.

According to the lighting device 2 in the second embodiment, the inner surface of the reflector 21 is constituted by the discontinuous reflection surfaces 211, 212, and 213. Thus, the degree of freedom for designing the shape of the reflector 21 increases. For example, the spheroid constituting the reflection surface 212 may be a spheroid crossing the spheroid constituting the reflection surface 213 only in the vicinity of the end of the elliptic major axis. Thus, the selection range of the length of the elliptic major axis of the spheroid constituting the reflection surface 212 can be widened, and thus the design range of the optical path length from the light emission point 204 to the center of the lens portion 222 can be widened.

Moreover, a part of the contour of the reflection surface in this embodiment can be determined more freely than the contour of the reflection surface determined by a line along which two spheroids cross each other. When the connection surface is determined by the method of this embodiment, the contour of the reflection surface on the side opposite to the light source axis 2A can be freely designed, for example. Accordingly, the degree of freedom for designing the area of the reflection surface can be increased.

Furthermore, substantially no light emitted from the light mission point 204 reaches the connection surfaces 215 and 216. Thus, light utilization efficiency does not decrease. Since the center of the lens portion 211 positioned closest to the light source axis 2A in the lens portions 221, 222, and 223 is shifted from the light source axis 2A, light emitted from the light emission point 204 is converged to the position away from the light source axis 2A in the Y direction. The arc tube and the electrodes of the lamp light source are disposed on the light source axis 2A, and the light reflected by the reflection surface 211 is converged such that the light does not reach these components. Thus, light utilization efficiency can be improved.

According to the second embodiment, the reflection surfaces 211 through 213 are disposed without clearance and overlap as viewed from the light emission point 204. Alternatively, peripheral portions of two reflection surfaces may overlap with each other. As in this case, the connection surfaces may be determined according to the reflection surfaces. When reflection surfaces and connection surfaces disposed at positions different from those of the second embodiment, lowering of light utilization efficiency can be prevented by locating the reflection surfaces and the connection surfaces such that lights emitted from the light emission point 204 do not reach the connection surfaces.

Third Embodiment

A lighting device according to a third embodiment of the invention is now described. The third embodiment is different from the first embodiment in that a polarization conversion element is disposed between the lens array and the condenser lens. The polarization conversion element equalizes polarization condition of entering light and outputs the equalized light.

Figure 7:
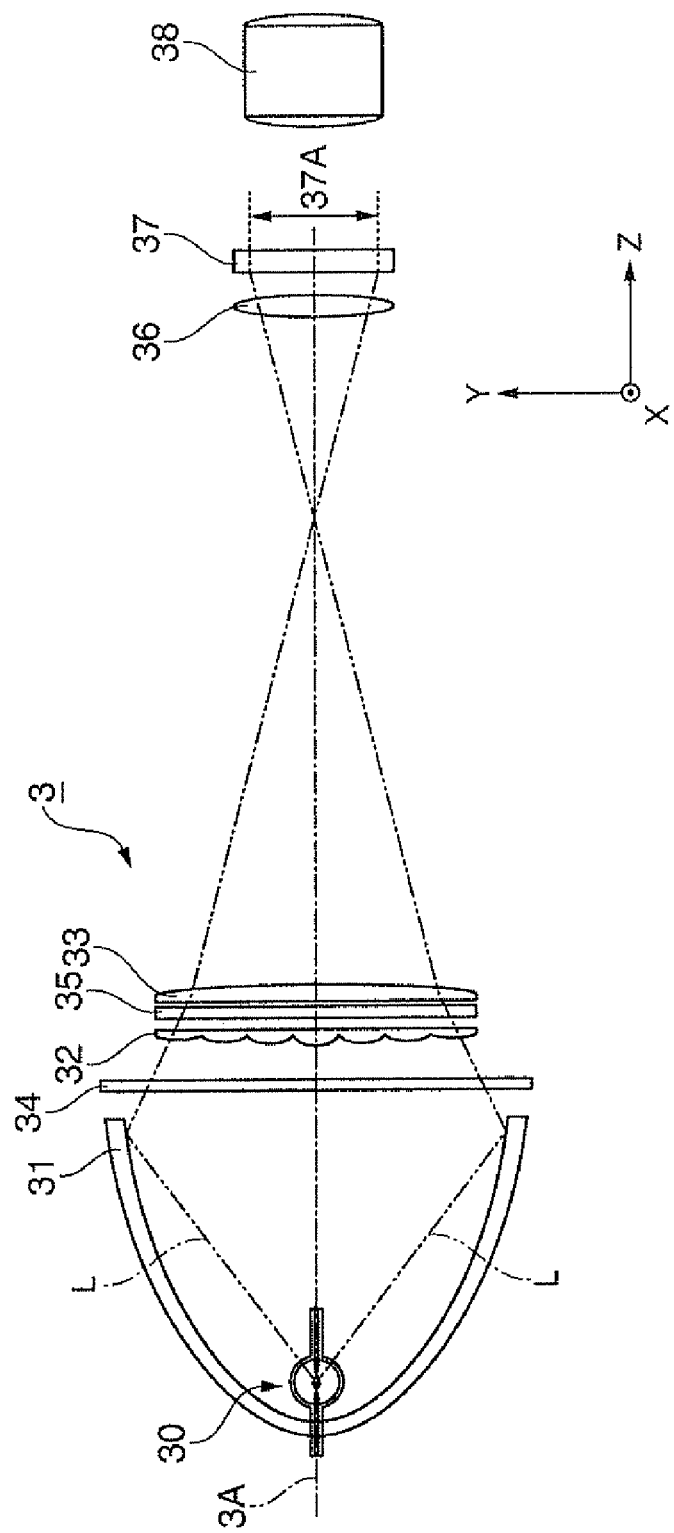
FIG. 7 illustrates a general structure of a lighting device according to a third embodiment.

FIG. 7 schematically illustrates a general structure of a lighting device 3 according to the third embodiment.

As illustrated in FIG. 7, the lighting device 3 includes a light emission lamp 30, a reflector 31, a lens array 32, a polarization conversion element 35, and a condenser lens 33. A filter 34 is disposed between the reflector 31 and the lens array 32. The lighting device illuminates a light receiving area 37A of a liquid crystal light valve 37. A field lens 36 is provided between the light receiving area 37A and the condenser lens 33. Light having entered the light receiving area 37A is converted into image light representing an image by the liquid crystal light valve 37, and the image light is expanded and projected on a screen or the like by a projection lens 38.

The components other than the polarization conversion element 35 in the third embodiment are similar to those of the first embodiment, and thus some detailed explanations of the similar components are not repeated.

Similarly to the first embodiment, light L emitted from the light emission lamp 30 is spatially divided to reach a plurality of reflection surfaces, and reflected by the plural reflection surfaces (see FIG. 4). The lights reflected by the plural reflection surfaces travel almost along a light source axis 3A, and components unnecessary for image such as ultraviolet light and infrared light are removed by the filter 34. The lights having passed the filter 34 pass the lens array 32, the polarization conversion element 35, and the condenser lens 33 in this order, and are stacked on the light receiving area 37A.

Figure 8A:
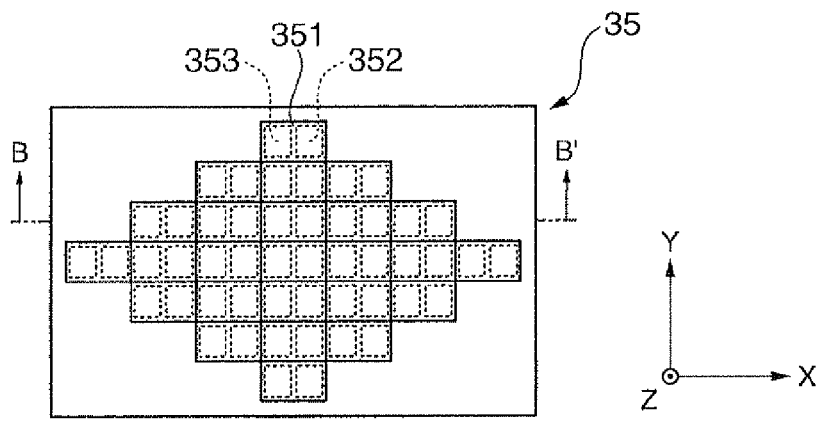
FIGS. 8A through 8C illustrate a structure of a polarization conversion element 35.
Figure 8B:
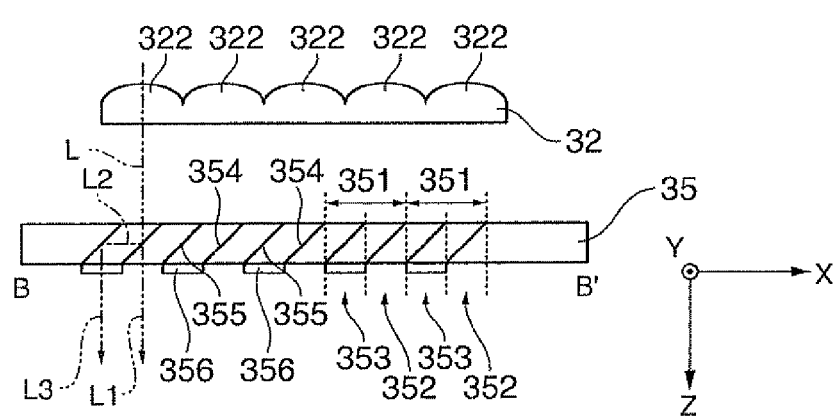
Figure 8C:
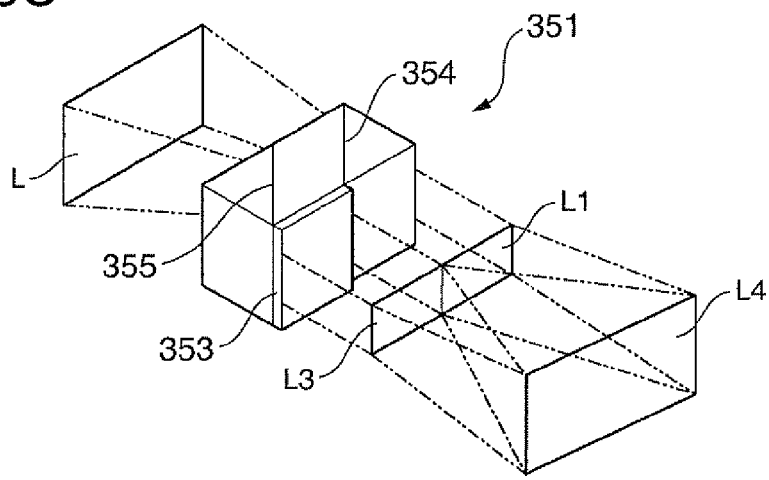

FIGS. 8A through 8C illustrate the structure of the polarization conversion element 35. FIG. 8A is a plan view of the polarization conversion element 35, FIG. 8B is a cross-sectional view taken along a line B-B' in FIG. 8A, and FIG. 8C schematically illustrates a concept of lights entering and leaving the polarization conversion element 35.

As illustrated in FIG. 8A, the polarization conversion element 35 has a plurality of polarization conversion portions 351. The plural polarization conversion portions 351 are disposed in array similarly to plural lens portions of the lens array 32 (see FIG. 2B). The shapes and sizes of the plural polarization conversion portions 351 are substantially uniform. The flat shapes of the polarization conversion portions 351 are substantially similar to the flat shape of the light receiving area 37A, that is, the flat shapes of the lens portions.

One polarization conversion portion 351 corresponds to one lens portion of the lens array 32. Each of the polarization conversion portions 351 has a separation portion 352 and a conversion portion 353. The separation portion 352 and the conversion portion 353 are disposed side by side in the longer side direction of the polarization conversion portion 351, that is, the longer side direction (arrangement direction) of the flat shape of the reflection surface of the reflector 31. Each size of the separation portion 352 and the conversion portion 353 is about half of the polarization conversion portion 351 as viewed in the plan view.

As illustrated in FIG. 8B, lights having passed lens portions 322 are converged to the separation portions 352 of the corresponding polarization conversion portions 351. Each of the separation portions 352 has a polarization beam splitter film (PBS film) 354. Each of the conversion portions 353 has a reflection film 355 and a ½ phase film 356. The PBS films 354 and the reflection films 355 are cyclically and alternately disposed in the longer side direction of the polarization conversion portions 351. In this embodiment, the PBS films 354 and the reflection films 355 are provided such that an angle of about 45 degrees can be formed by each film normal line direction and the optical axis of the entering light L.

The PBS films 354 transmit P-polarized light of the light entering the PBS films 354, and reflect S-polarized light of the light entering the PBS films 354. In the following description, P-polarized light entering the PBS films 354 is abbreviated as P-polarized light, and S-polarized light entering the PBS films 354 is abbreviated as S-polarized light as well.

The ½ phase films 356 rotates the polarization direction of the entering light by about 90 degrees before output.

In the polarization conversion portions 351 having this structure, P-polarized light L1 of the light L having entered the separation portions 352 passes through the PBS films 354 to be released in the light source axis direction (Z direction) without change. S-polarized light L2 of the light L is reflected by the PBS films 354 such that the optical axis is bent by about 90 degrees to enter the reflection films 355. The light L2 having entered the reflection films 355 is again reflected by the reflection films 355 such that the optical axis is bent by 90 degrees. Then, the light L2 travels in the light source axis direction, and enters the ½ phase films 356. The S-polarized light L2 having entered the ½ phase films 356 rotates its polarization direction by about 90 degrees to become P-polarized light L3, and is released in the light source axis direction.

As illustrated in FIG. 8C, the light L released from the lens portions of the lens array 32 has a cross-sectional shape orthogonal to the light source axis 3A of the light L as a substantially rectangular shape similar to the flat shape of the light receiving area 37A. The polarization condition of the light L having entered the separation portions 352 is equalized after divided into P-polarized light and S-polarized light. Then, the P-polarized light L1 having passed the separation portions 352 and the P-polarized light L3 having passed the conversion portions 353 are released in line in the cyclic direction of the separation portion 352 and the conversion portion 353 disposed side by side. Each cross-sectional shape of the P-polarized light L1 and P-polarized light L3 has substantially rectangular shape similar to the cross-sectional shape of the light L. Then, the P-polarized light L1 and the P-polarized light L3 are stacked on the light receiving area 37A to produce combined light L4. The cross-sectional shape of the light L4 has a substantially rectangular shape similar to the cross-sectional shape of the light L, that is, a substantially rectangular shape similar to the flat shape of the light receiving area 37A.

According to the lighting device 3 having this structure, the light receiving area 37A is illuminated by light having equalized polarization condition, and light utilization efficiency of the image forming device (liquid crystal light valve) which forms image light by utilizing polarization condition of entering light is increased. Moreover, light emitted from the lamp light source is converged to the separation portions 352 by using the reflection surfaces. Thus, loss of light produced by entrance of a part of light into the conversion portions 353 from the lamp light source or for other reasons can be prevented.

The arrangement direction of the reflection surfaces of the reflector 31 almost agrees with the cyclic directions of the separation portions 352 and the conversion portions 353. Thus, the direction in which the lights released from the lens portions are disposed in line almost coincides with the cyclic direction. Accordingly, the lights released from the lens portions can enter the separation portions 352 with high accuracy, and loss of light produced by entrance of light into unexpected positions such as conversion portions 353 can be prevented.

The longer side direction of the reflection surfaces projected on the plane orthogonal to the light source axis 3A agrees with the longer side direction of the polarization conversion portions 351. Thus, the cross-sectional shape of the light released from the polarization conversion portions 351 becomes similar to the flat shape of the light receiving area 37A. In this case, the lights released from the plural polarization conversion portions 351 can be stacked without excess and shortage on the light receiving area 37A. Accordingly, illumination with uniform illuminance can be achieved, and light utilization efficiency can be improved.

Fourth Embodiment

A lighting device according to a fourth embodiment is now described. The fourth embodiment is different from the first embodiment in that the reflector is provided in such a condition as to surround a part of the light source, and that a second reflector is provided in such a condition as to surround at least a part different from the part of the light source surrounded by the reflector.

Figure 10:
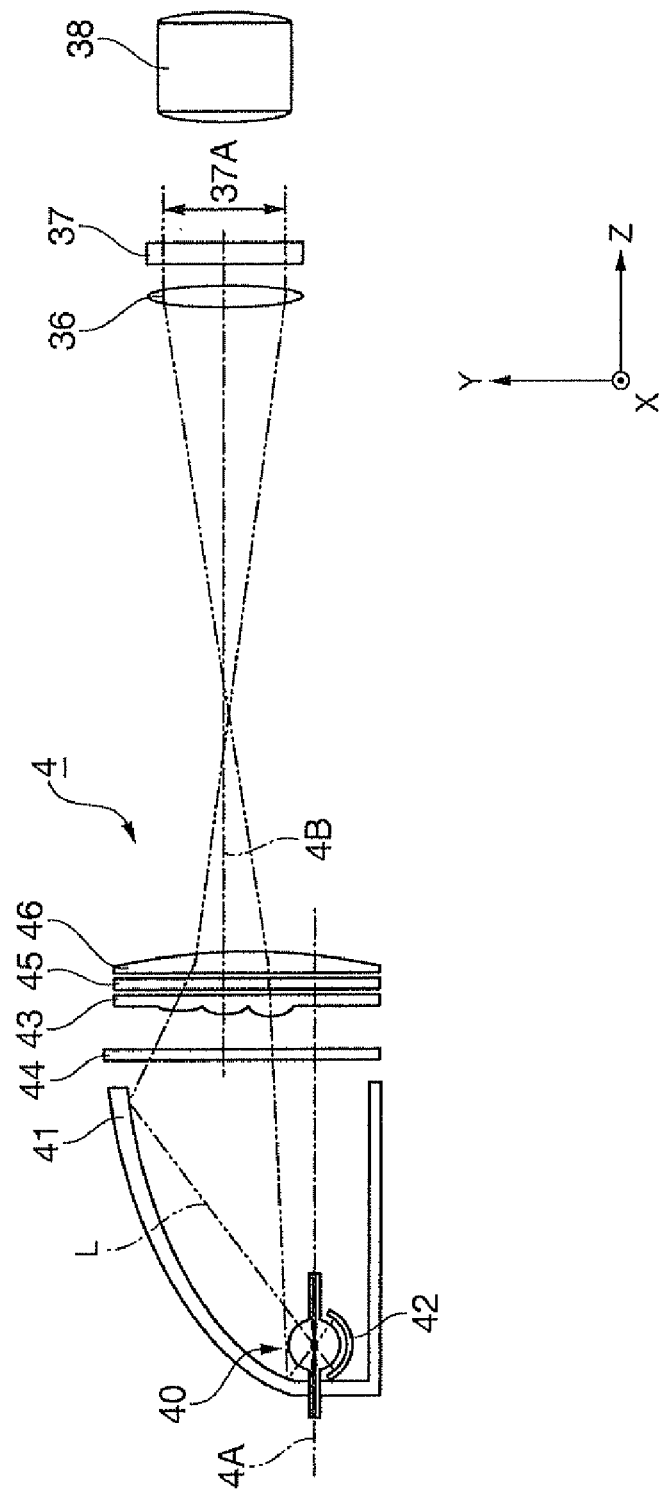
FIG. 10 illustrates a general structure of a lighting device according to a fourth embodiment.
Figure 11:
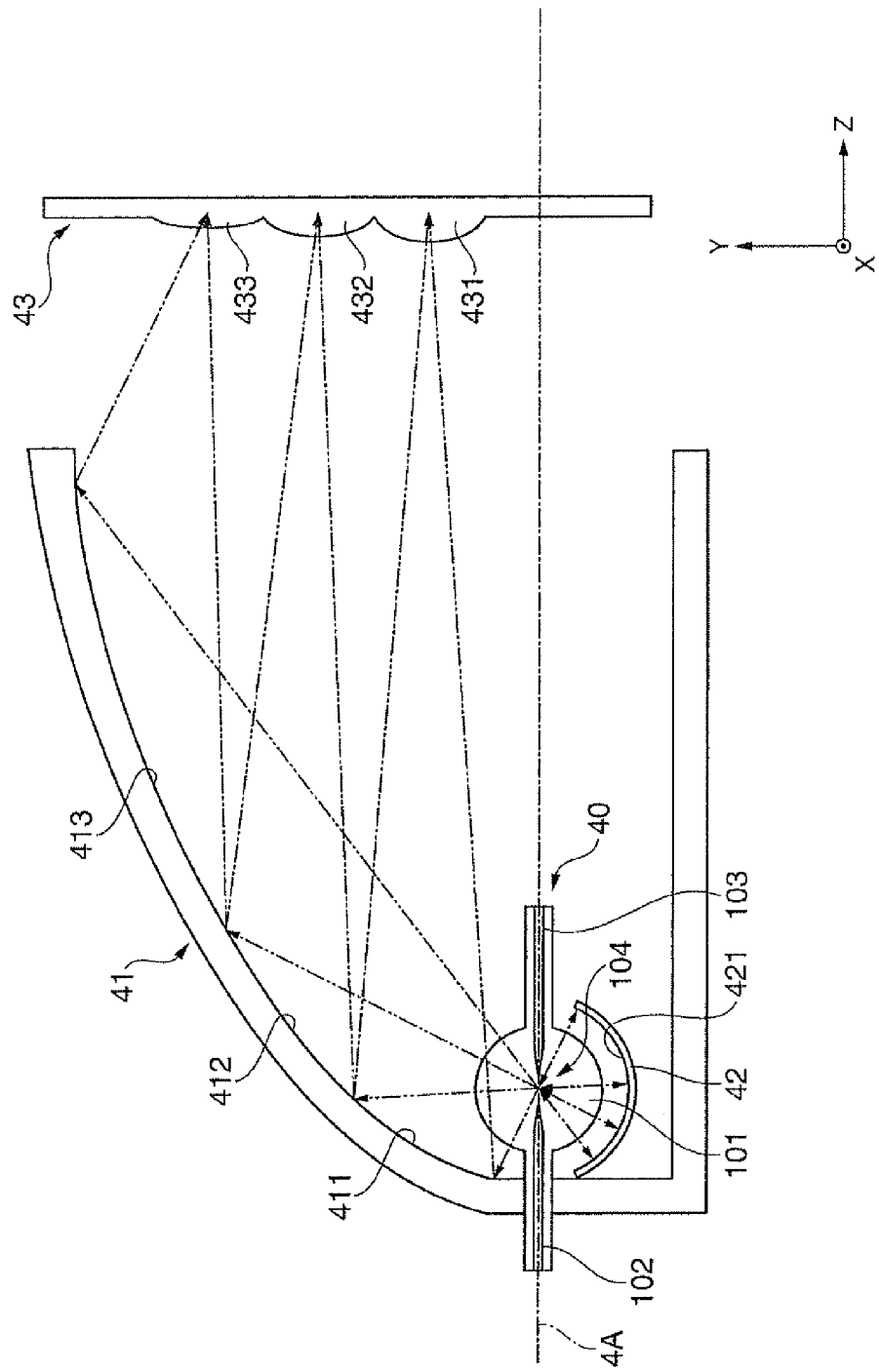
FIG. 11 illustrates an enlarged main part of the lighting device in the fourth embodiment.

FIG. 10 schematically illustrates a general structure of a lighting device 4 according to the fourth embodiment, and FIG. 11 illustrates an enlarged main part of the lighting device 4. The lighting device 4 shown in FIG. 10 includes a light emission lamp 40, a reflector 41, a second reflector (sub mirror) 42, a lens array 43, a polarization conversion element 45, and a condenser lens 46. A filter 44 is disposed between the reflector 31 and the lens array 43.

The reflector 41 surrounds a part of the light source 40. The sub mirror 42 is disposed on the side of the light source 40 opposite to the reflector 41. The part of the light source 40 surrounded by the sub mirror 42 is different from the part of the light source 40 surrounded by the reflector 41. Almost the entire area of the light source 40 is surrounded by the reflector 41 and the sub mirror 42. In the lighting device 4, a main optical axis 4B extends substantially parallel with a light source axis 4A, and is shifted toward the reflector 41 from the light source axis 4A.

The lighting device 4 illuminates the light receiving area 37A of the liquid crystal light valve 37. The field lens 36 is disposed between the light receiving area 37A and the condenser lens 46. Light having entered the light receiving area 37A is converted into image light representing an image by the liquid crystal light valve 37. The image light is expanded and projected on a screen or the like by the projection lens 38.

According to the fourth embodiment, the components other than the reflector 41, the sub mirror 42, and the lens array 43 are similar to those of the third embodiment. The lens array 43 is similar to the lens array 12 of the first embodiment except that the lens portion is not provided at the position at which the lens array 43 crosses the light source axis 4A.

As illustrated in FIG. 11, reflection surface 411, reflection surface 412, and reflection surface 413 are provided on the inner surface of the reflector 41 in this order in the direction away from the light source axis 4A in the Y direction. The respective flat shapes of the reflection surfaces 411 through 413 are similar to those of the reflection surfaces 112 through 114 of the reflector 11 of the first embodiment. Lens portions 431 through 433 are formed as one piece unit. The respective center positions of the lens portions 431 through 433 are disposed on the same flat plane substantially orthogonal to the main optical axis 4B. The lens portion 431 corresponds to the reflection surface 411. The lens portions 432 and 433 correspond to the reflection surface 412 and 413, respectively. The focal distances of the lens portions 431 through 433 become longer as the distances between the positions of the lens portions 431 through 433 and the light source axis 4A increase. The respective focal distances of the lens portions 431 through 433 are controlled such that the respective exit pupils of the reflection surfaces 411 through 413 become conjugate with the light receiving area 37A.

The sub mirror 42 has a reflection surface 421 on the side surrounding the light emission point 101 of the light source 40. In this embodiment, the shape of the reflection surface 421 corresponds to a part of a spherical surface which has the center located at the light emission point 101. Light emitted from the light emission point 101 toward the sub mirror 42 is reflected and bent by the reflection surface 421, and is divided into partial lights to enter the reflection surfaces 411 and 412 of the reflector 41. The lights having passed the sub mirror 42 and reflected by the reflection surfaces 411 and 412 are converged to the lens portions 431 through 433. The light emitted from the light emission point 101 toward the reflector 41 is similarly divided into partial light to enter the reflection surfaces 411 and 412. Then, the lights are reflected by the reflection surfaces 411 and 412, and converged to the lens portions 431 through 433.

As described in the third embodiment, the polarization conditions of the lights having entered the lens array 43 are equalized by a polarization conversion element 45, and stacked on the light receiving area 37A by the condenser lens 46.

According to the lighting device 4 having this structure, light emitted toward the sub mirror 42 is extracted to the outside via the reflector 41. By this method, an amount of light similar to that of the light obtained by a reflector surrounding the entire circumference of the light source around the light source axis 4A (such as the reflector 11 of the first embodiment) can be obtained. The sub mirror 42 is only required to reflect light having emitted toward the sub mirror 42 to the reflector 41, and thus the size of the sub mirror 42 can be made smaller than the size of the reflector 41. Accordingly, the total size of the reflector 41 and the sub mirror 42 can be made smaller than the reflector 11 of the first embodiment. Thus, size reduction of the lighting deice 4 can be achieved.

The spot size of the light emitted from the reflector 41 is smaller than that of the first embodiment. Thus, the sizes of the optical components disposed between the reflector 41 and the light receiving area 37A such as the polarization conversion element 45 and the condenser lens 46 can be reduced. Accordingly, the lighting device 4 in the first embodiment can be made considerably compact.

Projector

Figure 9:
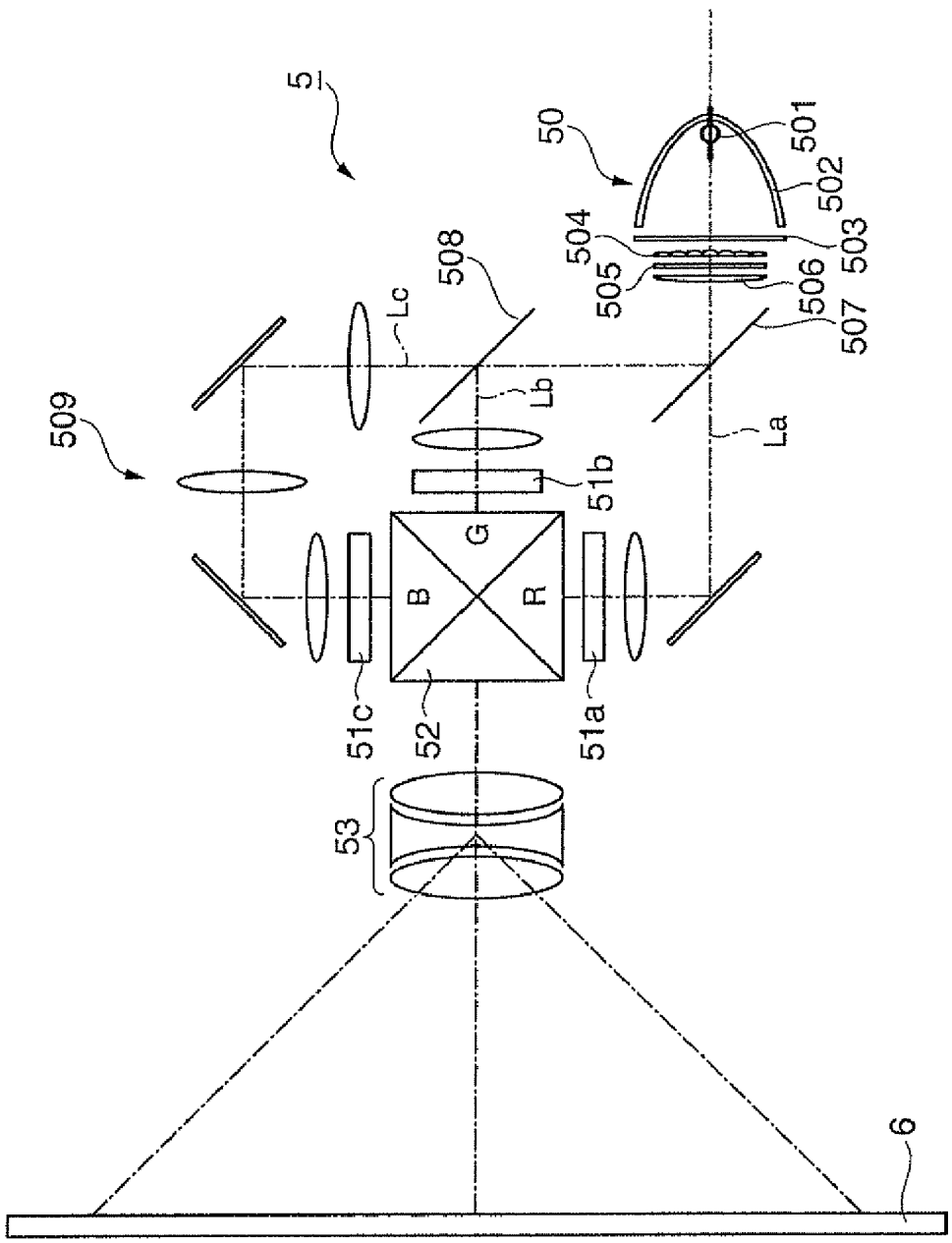
FIG. 9 illustrates a general structure of a projector according to an example.

A projector as an example of the invention is hereinafter described with reference to FIG. 9. As illustrated in FIG. 9, a projector 5 includes a lighting device 50, liquid crystal light valves (image forming devices) 51a, 51b, and 51c, a cross dichroic prism 52, and a projection lens (projection device) 53. The lighting device 50 corresponds to the lighting device according to the invention, and includes a lamp light source 501, a reflector 502, a filter 503, a lens array 504, a polarization conversion element 505, and a condenser lens 506. Light emitted from the lighting device 50 passes through dichroic mirrors 507 and 508, a relay system 509 and the like, and enters the liquid crystal light valves 51a through 51c.

The dichroic mirrors 507 and 508 are produced by laminating dielectric multilayer films on a glass surface, for example. By this structure, the dichroic mirrors 507 and 508 selectively reflect color lights in a predetermined wavelength band and transmit color lights in other wavelength band. For example, red light La of light emitted from the lighting device 50 is transmitted through the dichroic mirror 507, and green light Lb and blue light Lc of the light from the lighting device 50 are reflected by the dichroic mirror 507. The blue light Lc reflected by the dichroic mirror 507 is transmitted through the dichroic mirror 508, and the green light Lb reflected by the dichroic mirror 507 is reflected by the dichroic mirror 508.

The red light La having passed the dichroic mirror 507 is reflected by a reflection mirror, passes a collimating lens, and enters the red light liquid crystal light valve 51a. The green light Lb reflected by the dichroic mirror 508 passes a collimating lens, and enters the green light liquid crystal light valve 51b. The blue light Lc having passed the dichroic mirror 508 passes through the relay system 509, and enters the blue light liquid crystal light valve 51c.

Each of the liquid crystal light valves 51a through 51c is an active matrix type and transmission type liquid crystal panel, for example, and has a liquid crystal layer sandwiched between a pair of electrodes. The liquid crystal light valves 51a through 51c are electrically connected with a signal source for supplying image signals. With supply of image signals from the signal source, voltage is applied between the electrodes to control azimuth of liquid crystal molecules according to the applied voltage. By this method, polarization condition of entering light is varied such that light having gradation corresponding to the polarization condition can be produced. The red light La, green light Lb, and blue light Lc modulated by the liquid crystal light valves 51a through 51c enter the cross dichroic prism 52.

The cross dichroic prism 52 has a structure constituted by affixed triangle-pole prisms, and contains a mirror surface which reflects the red light La and transmits the green light Lb, and a mirror surface which reflects the blue light Lc and transmits the green light Lb. These mirror surfaces cross each other at right angles. The red light La, green light Lb, and blue light Lc are selectively reflected or transmitted by these mirror surfaces to be released on the same side. By this step, the three color lights are stacked to produce combined light. This combined light is expanded and projected on a screen 6 by the projection lens 53. By this method, a color display image can be produced.

The projector 5 having this structure includes the lighting device 50 according to the invention. By using the miniaturized lighting device 50, the size of the projector 5 can be reduced. Moreover, since the projector 5 includes the lighting device 50 providing high light utilization efficiency, the projector 5 becomes a low power consumption type projector. Furthermore, the liquid crystal light valves 51a through 51c are illuminated by the lighting device 50 with uniform illuminance. Thus, the projector 5 can produce high-quality images.

Figure 12:
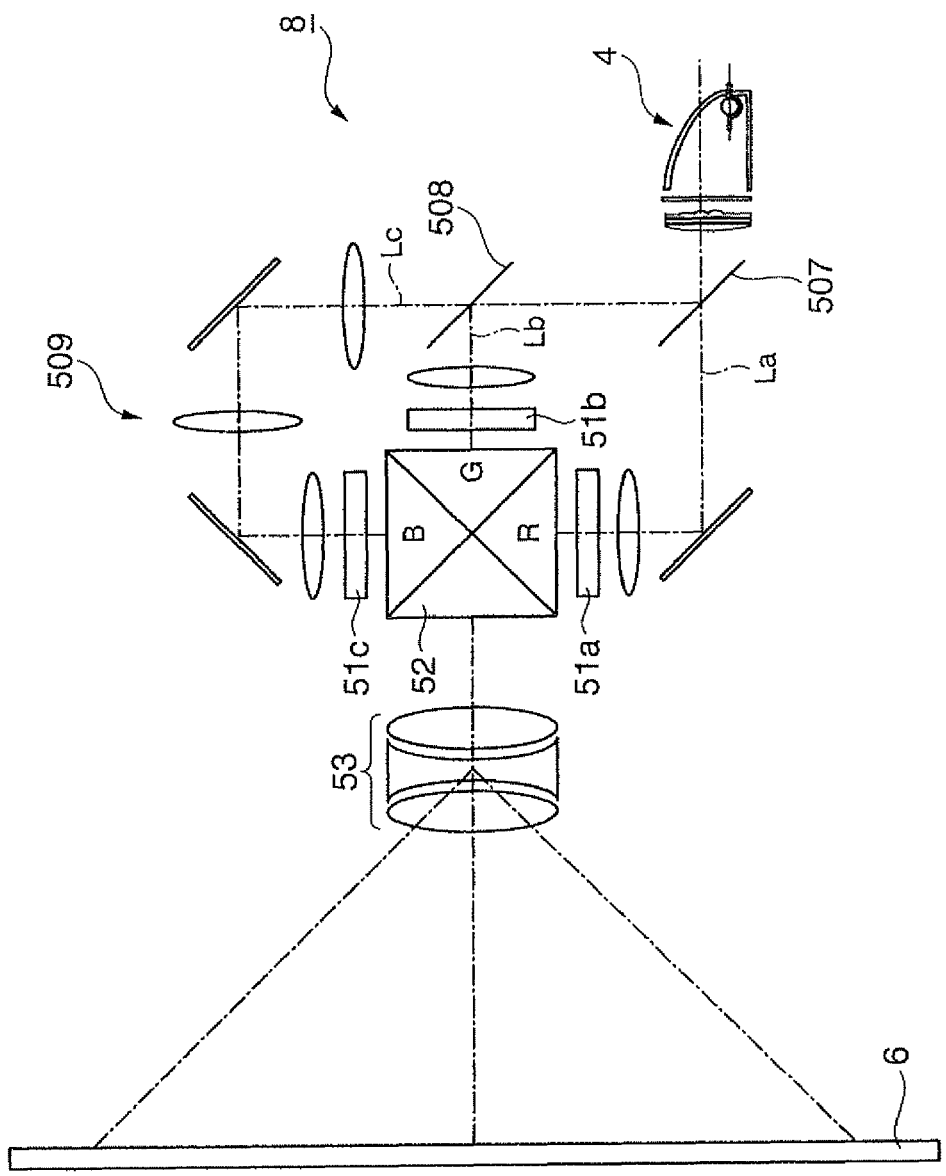
FIG. 12 illustrates a general structure of a projector according to an example different from the example shown in FIG. 9.

A projector according to another example of the invention is now discussed with reference to FIG. 12. As illustrated in FIG. 12, a projector 8 is different from the projector 5 in that the lighting device 4 of the fourth embodiment is included. According to the lighting device 4, the spot size can be made smaller than that of the lighting device 50 shown in FIG. 9. Thus, the optical components such as the dichroic mirrors 507 and 508 disposed between the lighting device 4 and the liquid crystal light valves 51a, 51b, and 51c can be small-sized. When comparing the lighting device 50 and the lighting device 4 having the size equivalent to the size of the lighting device 50, the amount of light emitted from the lighting device 4 is larger. This increases luminance of images to be displayed.

While the transmission-type liquid crystal light valves are used as the image forming devices in the above examples, reflection-type liquid crystal light valves can also be employed. In this case, optical systems are replaced with ones suited for the reflection-type liquid crystal light valves as necessary. Alternatively, image forming devices other than liquid crystal light valves can be used. For example, image forming devices such as digital mirror device other than liquid crystal light valves may be used.

The entire disclosure of Japanese Patent Application Nos. 2008-292420, filed Nov. 14, 2008 and 2009-183282, filed Aug. 6, 2009 are expressly incorporated by reference herein.

What is claimed is:

1. A lighting device comprising:
a light source which emits light around a light source axis;
a reflector which has a plurality of reflection surfaces for reflecting light emitted from the light source;
a plurality of converging units each of which is provided for a corresponding reflection surface of the plurality of reflection surfaces to receive light released from the corresponding reflection surface; and
a stacking system which stacks light having passed the plurality of converging units on a light receiving area,
wherein:
each of the plurality of reflection surfaces is formed by a part of a spheroid having focuses at a position of the corresponding converging unit and a position of the light source, and
a focal distance of each of the plurality of converging units becomes longer as a distance between the position of the converging unit and a corresponding point of the light source axis increases, a line connecting the position of the converging unit and the corresponding point of the light source axis being perpendicular to the light source axis.

2. The lighting device according to claim 1, further comprising:
a lens array having the plural converging units as a one piece unit, wherein the length of each elliptic major axis of the spheroids corresponding to the plural reflection surfaces differs according to the plural reflection surfaces.

3. The lighting device according to claim 1, wherein each exit pupil of the plural reflection surfaces is conjugate with the light receiving area.

4. The lighting device according to claim 1, wherein each area of the plural reflection surfaces becomes larger as the distance between the position of the converging unit for the corresponding reflection surface and the light source axis increases.

5. The lighting device according to claim 1, wherein the shapes of the plural reflection surfaces projected on a plane orthogonal to the light source axis are substantially similar to the shape of the light receiving area.

6. The lighting device according to claim 1, wherein:
a polarization conversion element which equalizes polarization condition of entering light is disposed on the optical path between the reflector and the light receiving area;
the polarization conversion element has separation portions for separating entering light into first polarized light and second polarized light oscillating in directions orthogonal to each other, and conversion portions for converting the second polarized light separated by the separation portions into the first polarized light, the separation portions and the conversion portions being alternately and cyclically disposed; and
the plural reflection surfaces are disposed in a direction that almost coincides with the cyclic direction in which the separation portions and the conversion portions are disposed.

7. The lighting device according to claim 1, wherein:
the reflector is provided such that the reflector surrounds a part of the light source; and
the lighting device further includes a second reflector provided in such a condition as to surround at least a part of the light source different from the part surrounded by the reflector to reflect light emitted from the light source toward the reflector.

8. A projector comprising:
the lighting device according to claim 1;
an image forming device which forms image light representing an image by using light emitted from the lighting device; and
a projection device which projects the image light formed by the image forming device.

* * * * *